United States Patent [19]

Byrne

[11] Patent Number: 4,551,577
[45] Date of Patent: Nov. 5, 1985

[54] RETRACTABLE POWER CENTER

[76] Inventor: Norman R. Byrne, 2736 Honey Creek, NE., Ada, Mich. 49301

[21] Appl. No.: 517,182

[22] Filed: Jul. 25, 1983

[51] Int. Cl.$^4$ ................................................ H01H 9/02
[52] U.S. Cl. ....................................... 174/57; 174/48; 339/34
[58] Field of Search ............... 361/338, 339, 391, 428; 339/34; 174/48, 57, 58; 307/147; 312/223

[56] References Cited

U.S. PATENT DOCUMENTS

| | | | |
|---|---|---|---|
| 1,866,572 | 2/1932 | Gourley et al. | 361/338 |
| 2,441,643 | 5/1948 | Michler | 174/48 |
| 2,654,056 | 9/1953 | Milander et al. | 361/334 |
| 2,811,574 | 10/1957 | Guerrero | 174/57 |
| 2,811,575 | 10/1957 | Guerrero | 174/57 |
| 2,866,956 | 12/1958 | Miller et al. | 339/34 |
| 3,088,054 | 4/1963 | Meyer | 174/52 R |
| 3,131,512 | 5/1964 | MacLeod | 174/48 |
| 3,135,821 | 6/1964 | Lanham | 174/48 |
| 3,433,886 | 3/1969 | Myers | 339/34 |
| 3,614,144 | 10/1971 | Hodges | 174/58 |
| 3,646,244 | 2/1972 | Cole | 174/57 |
| 3,794,956 | 2/1974 | Dubreuil | 174/48 |
| 3,883,202 | 5/1975 | Konig | 312/223 |
| 4,059,321 | 11/1977 | Rasmussen et al. | 174/48 |
| 4,372,629 | 2/1983 | Propst et al. | 312/223 |

FOREIGN PATENT DOCUMENTS

2,116,401 10/1972 Fed. Rep. of Germany ........ 174/48
0599844 11/1959 Italy ..................................... 174/48

Primary Examiner—A. D. Pellinen
Assistant Examiner—Gregory D. Thompson
Attorney, Agent, or Firm—Varnum, Riddering, Schmidt & Howlett

[57] ABSTRACT

A retractable power center (100) for providing conveniently located electrical power source receptacles (138) is adapted to be mounted in a work surface (101) such as a desk top or similar article. In one embodiment, the power center (100) includes a rectangular housing (102) received within a slot (107) formed in the work surface (101), a clamping arrangement (124, 126) to secure the housing (102) to the work surface (101) and a lower extrusion (112) connected to the lower portion of the housing (102). A movable power carriage (132) mounts the receptacles (138) and a catch assembly (160, 162) releasably maintains the carriage (132) in a closed, retracted position. In response to manual activation, the catch assembly (160, 162) is released and springs (152) tensioned between the carriage (132) and extrusion (112) exert forces so as to extend the carriage (132) upward into an extended, open position. In the open position, the user can energize desired electrical devices from the receptacles (138) and then lower the carriage (132) into the releasably secured, retractable position.

20 Claims, 13 Drawing Figures

RETRACTABLE POWER CENTER

DESCRIPTION

1. Technical Field

The invention relates to electrical power source enclosures and, more particularly, to power centers having electrical receptacles and mountable in furniture assembies and the like.

2. Background Art

Historically, one problem common to all types of residential, commercial and industrial environments employing electrical power is the positioning of electrical power outlet receptacles, with respect to both convenience and cost efficiency. That is, electrical receptacles for supplying power to various types of devices (fans, lamps, electric typewriters, etc.) must be located in accessible positions for all types of use.

However, the cost of electrical materials rapidly increases as the number of power source receptacles and associated equipment is increased. In addition, and perhaps more importantly, the conventional design of single or double unit receptacles within walls or floor surfaces, which are often a substantial distance from electrical devices, causes unsightly, and sometimes dangerous, arrays and resultant entanglements of the electrical cords connected to the devices.

To overcome the problems of efficiency and convenience of electrical outlet design, it is not uncommon to employ multiple receptacle raceways having a number of receptacles and a common power source cord plugged into a utility outlet. Again, however, these raceways result in unsightly and entangled arrays of electrical device cords. In addition the raceways are typically located on floor surfaces and are not particularly convenient.

It is also known to employ electrical receptacles rigidly and directly mounted to various types of furniture, such as bookshelves and desks. These receptacles are typically mounted at a location substantially above the floor surface and allow the user to plug in electrical devices nearer their location of use, thereby avoiding the necessity of running device cords a substantial distance. However, rigidly secured receptacles must be mounted in a manner so that the user can readily insert device plugs. Accordingly, these receptacles are typically in a fairly "open" location, and the device cords again prove to be unsightly and space consuming. If, alternatively, the receptacles are substantially hidden from view, they can be difficult to access.

As an example of directly mounted receptacles, the U.S. Pat. No. 3,883,202 to Konig issued May 13, 1975, shows a desk having an integrally incorporated transverse trough with receptacles located in the trough bottom. Electrical supply lines can be laid in the trough and extended through longitudinal slots in the rear of the desk. The arrangement is not particularly aesthetically desirable, and the receptacles are somewhat difficult to access.

Another problem with receptacles rigidly mounted within various types of furniture relates to the development of modern furniture systems, which are rapidly gaining increased use in all types of environments. These furniture systems often employ modular and interchangeable furniture components. In some instances, a number of receptacles may be required at a work station, such as a secretarial work place having a typewriter, computer display terminal, and the like. Other work stations having similar furniture components may require few, if any, receptacles. Accordingly, it is advantageous to selectively choose and locate the number of receptacles available to the user.

A system employing covered receptacles mounted within a work station is disclosed in the U.S. Pat. No. 4,372,629 to Propst et al issued Feb. 8, 1983. The Propst et al arrangement includes a desk top having a rear cover hinged to a vertical back panel. Receptacles are mounted to the lower portion of the cover and bristles extend horizontally from the cover to an edge of the desk top when the cover is closed. When the cover is open, the user can plug in the cord of a desired electrical device and close the cover, with the cord then extending through the bristles.

Although the Propst et al arrangement is relatively more aesthetically pleasing than other known arrangements, the necessity of manually opening the hinged covering at the rear of the desk top is somewhat inconvenient for the user. In addition, the arrangement requires a combined work surface and back panel configuration, and the hinged cover is not secured in any manner when it is in a closed position.

DISCLOSURE OF THE INVENTION

According to the invention, a power center adapted to be mounted in a furniture component and comprising receptacle means for supplying electrical power to electrical devices from an interconnected common power source includes a stationary housing means mounted within a slot formed in the furniture component. Carriage means mounting the receptacle means are connected to the housing means for mounting the receptacle means so as to move with respect to the housing means. Activating means interconnect the housing means and the carriage means, and impart forces to the carriage means so as to move the receptacle means between a retracted, closed position and an open, extended position. The receptacle means is substantially hidden from view when the carriage means is in the retracted position, and is accessible to a user to receive power cords and plugs of the electrical devices when the carriage means is in the extended position. The carriage means is thus mounted to the housing means in a manner so as to allow the electrical devices to remain energized by the receptacle means when the carriage means is in the retracted position.

The carriage means includes a cover means positioned substantially flush with a surface of the furniture component when the carriage means is in the retracted position. The cover means thus hides the receptacle means and power cords from view below the furniture component surface when the carriage means is in the retracted position. In addition, the cover means includes flexible means for allowing the power cords of the electrical devices to extend through the cover means while still maintaining the receptacle means substantially hidden from view. The cover means can comprise a plate partially enclosing the slot, and the flexible means can comprise a set of brushes extending outwardly from one end of the plate in substantially the same plane.

The carriage means comprises an elongated receptacle box positioned within the housing means and below an outer surface of the furniture component when the carriage means is in the retracted position. Correspondingly, the receptacle box is extendable above the outer surface of the furniture component when the carriage means is in the open position. The receptacle means is mounted on an outer surface of at least one side of the receptacle box, and the resilient means is secured to a lower end of the receptacle box.

The activating means comprises coiled spring means having a lower end rigidly connected to a lower portion of the carriage means. An upper end of the resilient means is coupled to the housing means. The coiled spring means is maintained in an extended, loaded tension when the carriage means is in the retracted position. The power center includes means for releasably maintaining the carriage means in the retracted position, and the coiled spring means is responsive to the same to release the carriage means so as to move the carriage means to the extended position. Movement of the carriage means is caused by contraction of the coiled spring means. The coiled spring means can include one or more coiled springs extending parallel and adjacent to the receptacle box of the carriage means. Each of the springs includes one end rigidly secured to a lower end of the box. An upper end of the coiled springs is engaged with the housing means.

The means for releasably maintaining the carriage means in the retracted position can comprise spring means mounted to the housing means. The spring means thus imparts a force to the carriage means opposing extending movement of the carriage means towards the open position. In addition, catch means are mounted to the carriage means to releasably secure the spring means so as to maintain the carriage means in the closed position.

In one embodiment of the invention, the spring means comprises a catch spring mounted to the housing means. In addition, the catch means comprises a cam mounted to the receptacle box and having a cam-shaped lateral surface with a recess in an upper portion thereof. One end of the catch spring is engaged in the recess when the receptacle box is in the retracted position. In accordance with the invention, manually activated movement of the carriage means from the retracted position releases the catch spring from the recess of the cam.

In another embodiment of the invention, the means for releasably maintaining the carriage means includes a resilient clip means coupled to a manually adjustable handle. The clip means is connected to the carriage means and is partially received within a notch formed in the housing means when the carriage means is in the retracted position. Manual movement of the handle causes the clip means to be released from the notch, thus allowing extending movement of the carriage means relative to the housing means.

The power center also includes stop means for prohibiting further extending movement of the carriage means when the carriage means attains the open position. In one embodiment of the invention, the stop means includes a stop bracket mounted to the receptacle box of the carriage means and adapted to contact one end of the catch spring when the receptacle box attains the extended position.

The power center also includes clamping means connected to the housing means to rigidly secure the housing means to the furniture component. The clamping means can include threaded means rotatably mounted to the housing means to provide manual adjustment of the housing means within the slot. Clip means are threadably received on the threaded means and include flexible flange portions adapted to contact a lower surface of the furniture component so as to rigidly secure the housing means within the furniture component slot.

The housing means can include a stationary housing chamber having an upper collar positioned substantially flush with an upper surface of the furniture component. The collar overhangs the perimeter of the slot and a rectangular sleeve is connected to and extends below the upper collar. The sleeve is received within the slot and an elongated extrusion extends below the sleeve. The receptacle box of the carriage means is received within the extrusion and the power cords of the electrical devices are located within the extrusion when the devices are energized from the receptacle means.

DESCRIPTION OF THE DRAWINGS

The invention will now be described with reference to the drawings in which.

BEST MODE FOR CARRYING OUT THE INVENTION

Figure 1:
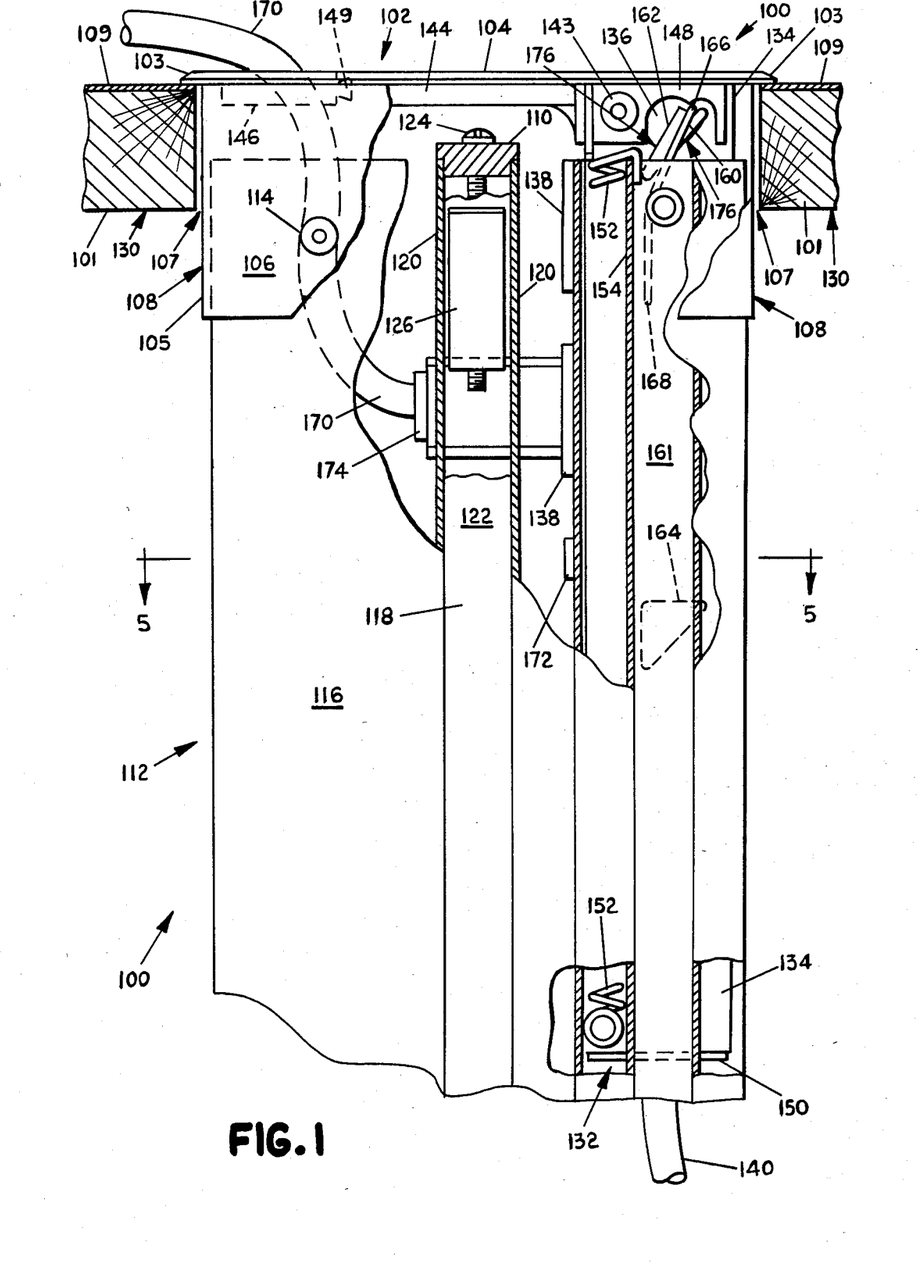
FIG. 1 is an elevational view of one embodiment of a retracable power center in accordance with the invention, with side portions of the housing wall and extrusion partially broken away.
Figure 2:
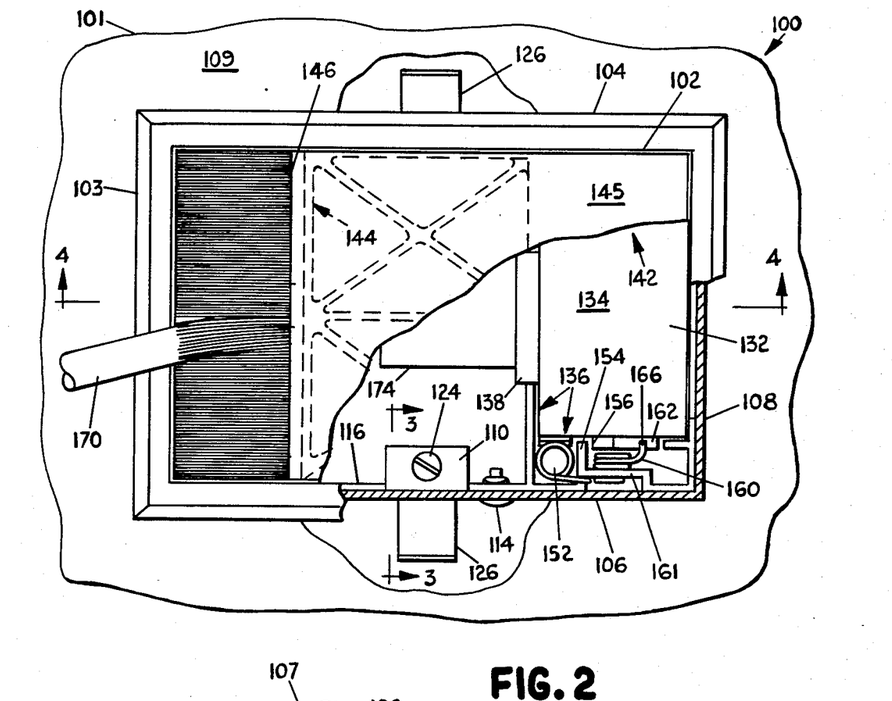
FIG. 2 is a plan view of the power center depicted in FIG. 1, with the cover assembly partially broken away.

The principles of the invention are disclosed, by way of example, in a retractable power center 100 as depicted in FIGS. 1–5. Referring to FIGS. 1 and 2, and relevant to other power centers in accordance with the invention and shown in FIGS. 3, 4, 7, 8, 10, 11 and 13, the power center 100 is adapted to be mounted within a rectangularly shaped slot 107 formed within a furniture component such as the work surface 101 partially depicted in the drawings. Work surface 101 can, for example, be the working surface of a desk or similar furniture component. Typically, the work surface 101 may have a veneer 109 or other conventional protective and aesthetically desirable surface secured to the top of work surface 101. The power center 100 provides a structurally sound and aesthetically desirable means for transferring power from a conventional power source located below the work surface 101 to one or more electrical outlet receptacles nearer the top of work surface 101 and electrical devices (not shown) to be energized from the receptacles.

The power center 100 is adapted to be releasably secured in a closed position when not in use, whereby the electrical receptacles and other portions of power center 100 are substantially hidden from view. Power center 100 is further adapted to be responsive to manual activation so as to automatically extend upward from the work surface 101 into an open position, whereby the electrical receptacles are then readily accessible to the user for inserting power cords and plugs from the electrical devices to be energized. In addition, the power center 100 is also operable to retract to the closed position below the work surface 101 so as to be hidden from view when the electrical devices have been plugged into the receptacles.

Referring specifically to FIGS. 1 and 2, the power center 100 includes a stationary upper housing or chamber 102 having a rectangularly shaped and vertically disposed sleeve 105 formed by lateral side portions 106 and integrally interconnected side portions 108. For purposes of description, the lateral side portion 106 depicted in FIG. 1 has been partially cut away. Mounted to the upper edge of sleeve 105 formed by the side portions 106, 108 is a horizontally disposed collar 104 having a rectangular configuration and a bezel-shaped portion 103 forming the periphery of collar 104. Again, for descriptive purposes, the collar 104 has been partially cut away in the view depicted in FIG. 2.

The slot 107 formed within work surface 101 is configured to have a length and width slightly larger than the corresponding distance between the lateral side portions 106 and the distance between opposing side portions 108. Conversely, the length and width corresponding to the outer perimeter of collar 104 formed by the bezel-shaped portion 103 are slightly larger than the corresponding dimensions of slot 107. Accordingly, when the housing 102 is inserted into the slot 107, the rectangular sleeve 105 is positioned below the veneer 109 on the top of work surface 101. Correspondingly, the outer perimeter of the collar 104 formed by the bezel-shaped portion 103 overhangs the slot 107 so as to be positioned above the work surface 101 with the lower surface of the bezel-shaped portion 103 substantially flush with the veneer 109.

Figure 4:
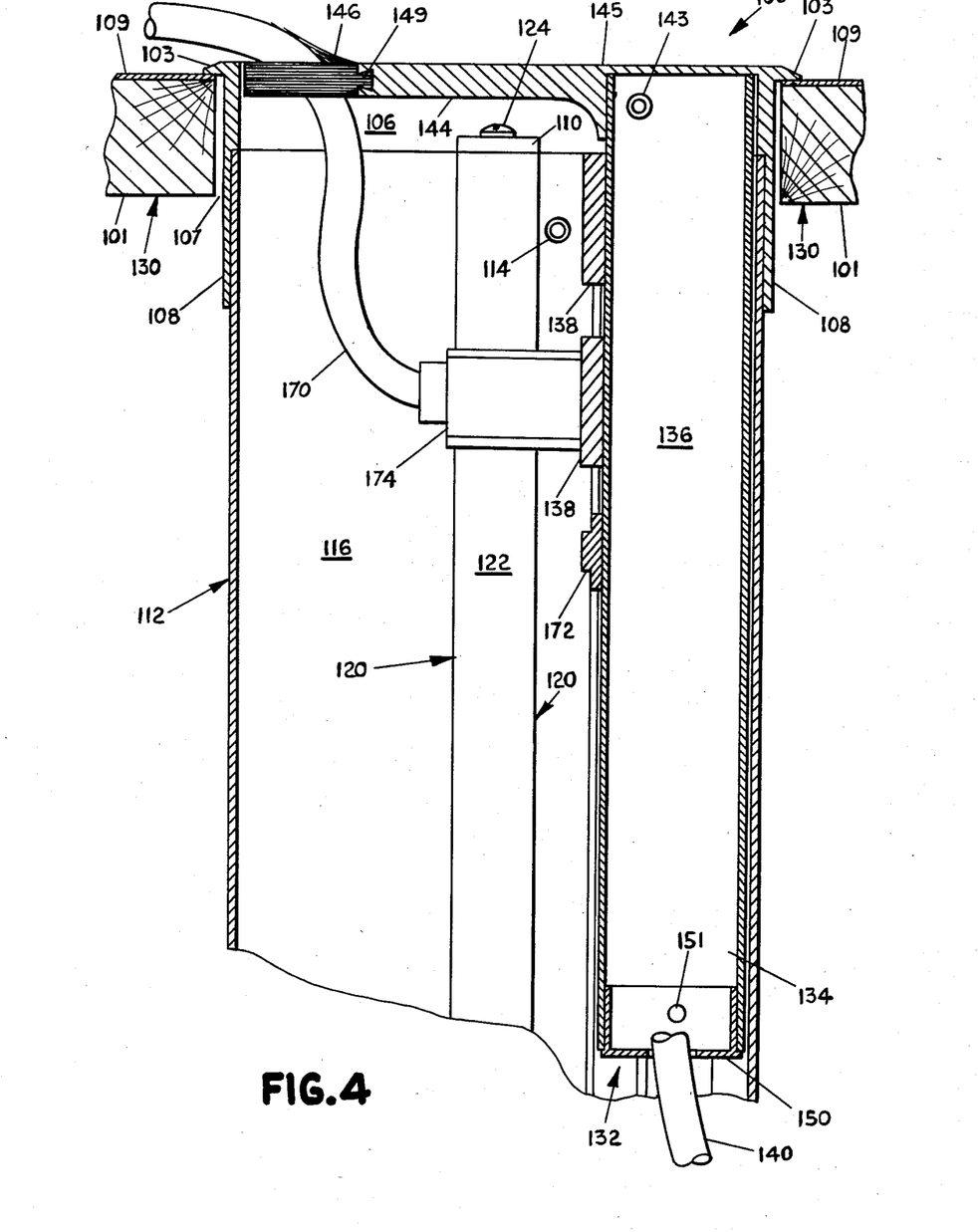
FIG. 4 is a sectional side view of the power center depicted in FIG. 1 taken along lines 4—4 of FIG. 2.
Figure 5:
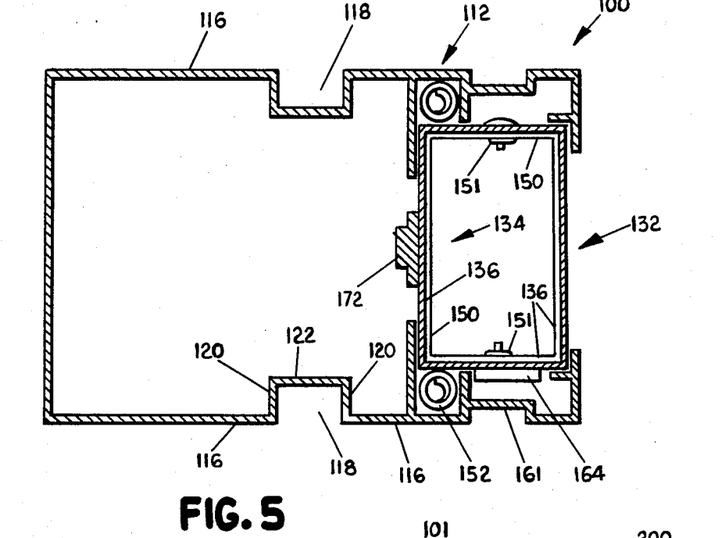
FIG. 5 is a sectional top view of the power center depicted in FIG. 1 taken along lines 5—5 of FIG. 1.

Below the top of work surface 101, the rectangular sleeve 105 of housing 102 is connected to and partially receives a stationary power center extrusion 12 having a vertical configuration as depicted in FIGS. 1 and 4, and a cross-sectional configuration as best depicted in FIG. 5. The extrusion 112 is substantially rectangular in general cross-sectional shape, and includes lateral side portions 116 rigidly secured to each of the corresponding lateral side portions 106 of housing 102 by means of nut-and-bolt assemblies 114 or other comparable and conventional connecting means as depicted in FIG. 2. For descriptive purposes, the extrusion 112 is shown partially cut away in FIG. 1 immediately behind one of the lateral side portions 116. The combination of the housing or chamber 102 and the extrusion 112 can be characterized as a housing means for the power center 100.

Figure 3:
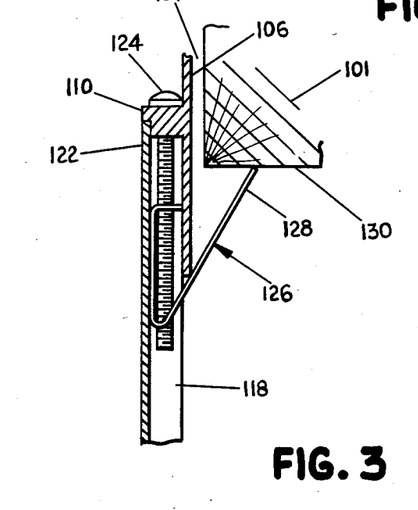
FIG. 3 is a fragmentary sectional view of one of the clamping assemblies of the power center depicted in FIG. 1 taken along lines 3—3 of FIG. 2.

To rigidly secure the housing 102 and connected extrusion 112 to the work surface 101, an inwardly directed and vertical slot 118 is formed in each of the lateral side portions 116 of extrusion 112. Each of the slots 118 includes a pair of opposing side portions 120 and a rear portion 122. At the upper portion of each slot 118, an inwardly extending ledge 110 is formed integral with each of the lateral side portions 106 of housing 102. As depicted in FIG. 3, each inwardly extending ledge 110 is stepped downwardly so that the side and rear portions 120 and 122, respectively, of slot 118 are fitted within the step formed in ledge 110.

As depicted in FIG. 3, each of the inwardly-extending ledges 110 includes a vertical bore adapted to receive a machine screw 124 or similar and conventional threaded component. Threaded onto each of the screws 124 is a spring clip 126 having a shape and configuration as depicted in FIGS. 1 and 3. The spring clip 126 includes a flexible angled flange portion 128 having an upper distal end adapted to contact a lower surface 130 of the work surface 101. When the housing 102 is fitted within the slot 107 of work surface 101, the machine screws 124 are rotated until the distal end of the flange portions 128 of spring clips 126 contact surface 130 of work surface 101. Further rotation of machine screws 124 causes the housing 102 to be forced downwardly until the horizontally disposed collar 104 is snugly fitted substantially flush with the veneer 109 mounted to the top of work surface 101. The pair of machine screws 124 and corresponding spring clips 126 can be characterized as a clamping means for rigidly securing the power center 100 within the slot 107 formed in work surface 101.

The power center 100 further includes a retractable power carriage 132 having a normally closed position as depicted in FIGS. 1, 2, 4 and 5. The power carriage 132 comprises a rectangularly shaped and open-ended receptacle box 134 having side portions 136 vertically positioned within the extrusion 112 on one side of the power center 100 as depicted in FIGS. 2 and 5. Mounted to the top of the box 134 is a cover assembly 142. For purposes of description, the cover assembly 142 is partially cut away in FIG. 2.

The cover assembly 142 includes a pair of downwardly extending brackets 148 each connected to outer surfaces of opposing side portions 136 of box 134. The connection is made by means such as rivets 143 (one of which is shown in FIG. 1) or comparable and conventional connecting means. The cover assembly 142 also includes a horizontally disposed cover plate 145 internally connected above the brackets 148 and positioned in substantially the same plane as the collar 104 of housing 102. The plate 145 completely covers the upper end of box 134 and extends towards the left side of the power center 100 as depicted in the view shown in FIG. 2. As depicted in FIGS. 1, 2 and 4, a reinforcing grid 144 is connected integrally with the cover plate 145 and extends downwardly therefrom. The grid 144 provides structural rigidity to the cover assembly 142 in view of the plate 145 being somewhat cantilevered relative to the interconnected box 134.

Extending outward from the leftmost edge of the cover plate 145 and reinforcing grid 144 as depicted in FIG. 2 is a set of flexible brushes 146. As shown in FIG. 4, the brushes 146 are secured to the reinforcing grid 144 by means of a notch 149 in which one end of the brushes 146 is rigidly secured. As will be apparent from subsequent description herein, the brushes 146 provide a flexible means for allowing electrical device cords to be energized from the power center 100 when the center 100 is in a normally closed and retracted position.

As depicted in FIGS. 1, 4 and 5, a cap 150 is secured to the lower portion of box 134 and mounts to the inner surfaces of side portions 136. A rigid connection between box 134 and cap 150 is made by rivets 151 or other suitable and conventional connecting means. Also secured to the lower portion of box 134 are a pair of coil springs 152. A lower end of each coil spring 152 is secured to the outer surface of an opposing side portion 136, while an opposing upper end of each coil spring 152 is hooked around a transversely disposed wall 154 of the extrusion 112. The resilient and movable interconnection of coil springs 152 between the wall 154 of extrusion 112 and the box 134 of carriage 132 provides the only interconnection between the aforementioned components of power center 100. When the power carriage 132 is in the normally closed and retracted position as depicted in FIGS. 1-5, the coil springs 152 are loaded with an extended tension force. Accordingly, in the absence of other means subsequently described herein for releasably securing the power carriage 132 in the normally closed position, the tendency of the coil springs 152 to contract and release the loaded tension would cause the lower ends of coil springs 152 connected to the box 134 to move upward. The coil springs 152 therefore provide a vertical activating means for imparting forces to the power carriage 132 so as to extend the box 134 upwardly from within extrusion 112 and the work surface slot 107. However, it will be apparent that other types of activating means in accordance with the invention can be employed to move the box 134 relative to slot 107.

Referring to FIGS. 1 and 2, the power center 100 also includes a catch spring 160 mounted to the upper portion of the extrusion 112. As specifically depicted in FIG. 2, the catch spring 160 is secured to the inner surface of a wall 161 and is positioned between the wall 161 and an adjacent side portion 136 of the box 134. Rigidly secured by suitable connecting means to the same side portion 136 of box 134 is a cam 162 having a planar configuration as depicted in FIG. 1. The flexible and vertically disposed catch spring 160 includes an inwardly-extending upper end portion 166 which engages and rides on the outer lateral surface 176 of the cam 162. With the power carriage 132 in the closed position as depicted in FIG. 1, the upper end portion 166 is flexed and positioned within an upper recess of the cam 162.

The catch spring 160 also includes a lower portion 168 which is shown in dotted-line format in FIG. 1 and tends to remain in a substantially straight elongated configuration throughout operation of the power center 100. As will be apparent from subsequent description of the operation of power center 100, the catch spring 160 and cam 162 provide a means for releasably securing the power carriage 132 in the closed position.

The power center 100 also includes a stop bracket 164 as depicted in FIGS. 1 and 5. The bracket 164 has a planar configuration as depicted in dotted line format in FIG. 1 and is rigidly secured by suitable connecting means to the side portion 136 of box 134 which mounts the cam 162 and is adjacent the catch spring 160. As will also be apparent from subsequent description herein, the interaction of catch spring 160 and the stop bracket 164 provides a means for halting upward movement of the carriage 132 and maintaining the carriage 132 in a fully opened and extending position.

Referring to FIGS. 1, 2 and 4, the power center 100 also includes a pair of electrical receptacles 138 mounted to the side portion 136 of box 134 facing toward the left as depicted in FIG. 2. The receptacles 138 are vertically aligned and include electrical wires or other suitable conductive elements (not shown) which extend downwardly and are energized by power supplied through a common power source cord 140 as depicted in FIG. 1. The cord 140 can extend upwardly through a slot or any suitable opening in the cap 150 and is conductively connected in any suitable manner to the receptacles 138. Preferably, the conductive path between the receptacles 138 and the power source cord 140 also includes one or more fuse or circuit breaker components 172 for purposes of overload protection. In addition, the conductive path between receptacles 138 and power source cord 140 can also include a suitable and conventional reset switch circuit or other means to allow manual reset of the conductive path if an overload occurs and is removed.

As depicted in FIG. 1, one of the receptacles 138 energizes an electrical device (not shown) having a power cord 170 and a plug 174. With the power center 100 and associated power carriage 132 in the closed position as depicted in the drawings, the electrical device power cord 170 extends from one of the receptacles 138 upwardly through the brushes 146 to the electrical device for which power is to be supplied. In addition, the power cord 170 may be coiled within the cavity created between box 134 and extrusion 112 before extending upwardly through brushes 146.

The operation of the power center 100 will now be described with respect to FIGS. 1-5. With the power center in a closed and retracted position, the coil springs 152 are loaded with an extended tension force. To prohibit the coil spring tension force from imparting forces to the carriage 132 so as to move the box 134 upwardly, the upper end portion 166 of catch spring 160 is engaged within the upper recess of the cam 162. Accordingly, with the cam 162 secured to the box 134 of carriage 132, upwardly extending movement of the carriage 132 is prohibited. That is, with the catch spring end portion 166 secured in the upper recess of cam 162, and with cam 162 mounted to box 134 and catch spring 160 mounted to stationary extrusion 112, upward movement of cam 162 is prohibited.

When the user desires to extend the power center 100 upwardly out of the slot 107 into an open position, the user will press downwardly on the cover plate 145 of cover assembly 142. Manually pressing on the cover plate 145 will cause the box 134 of carriage 132 to move downwardly a small distance. That is, a downward pressure on the cover plate 145 will cause extension of springs 152 and corresponding downward movement of cam 162 mounted to box 134 until the flexed end portion 166 of catch spring 160 clears the upper recess of cam 162 and "straightens". If the downward pressure on cover plate 145 is then relieved, the coil springs 152, being in an extended tensioned state, will tend to contract so that the lower ends of the coil springs 152, being secured to box 134, will move upwardly and correspondingly raise the box 134 upwardly to its extended position. It should be emphasized that cam 162 is an integral part of the box 134 and moves upwardly or downwardly with the box 134 and, as previously described, can be releasably retained by the upper end portion 166 of the catch spring 160 which is mounted to the stationary extrusion 112. It should also be emphasized that the upper ends of the coil springs 152 remain stationary and engaged around the walls 154 of extrusion 112. However, the lower ends of the coil springs 152 connected to the box 134 will move upward so as to decrease the extended tension force on the springs 152.

Upward and extending movement of the carriage 132 will continue until the lower end portion 168 of the catch spring 160 contacts the stop bracket 164 mounted to the box 134. When contact is made, the box 134 is prohibited from further movement, and the carriage 132 is in its fully open and extended position. The tendency of the coil springs 152 to release the extending tension force will cause the carriage 132 to remain in the open position until manually acted upon as subsequently described herein. It should also be emphasized that neither of the springs 152 attains a zero-tension equilibrium position prior to contact between catch spring 160 and stop bracket 164.

With the carriage 132 in the open position, the electrical receptacles 138 will be located above the upper surface of the work surface 101 and the horizontal plane of the veneer 109. It is apparent that the actual position of the receptacles 138 relative to the planar upper surface of work surface 101 will be dependent upon the initial positioning of receptacles 138 relative to the box 134 and the initial positioning of catch spring 160 relative to the stop bracket 164.

With the receptacles 138 positioned above work surface 101 and external to the slot 107, the user can then readily access the receptacles 138 to plug in desired electrical device power cords 170 and connected plugs 174. When the electrical devices have been energized, the user can then again press downwardly on the cover plate 145 of cover assembly 142. It should be emphasized that when the box 134 is in the extended position, the cam 162, being mounted to the box 134, is positioned above the catch spring 160 which is correspondingly mounted to the stationary extrusion 112. This downward movement will cause the coil springs 152 to increase their loaded tensioning force and the cam 162 to move downward toward the catch spring 160. As the cam 162 moves downward, the upper end portion 166 of catch spring 160 will contact the lateral surface 176. As the carriage 132 continues to move downward, the upper end portion 166 of catch spring 160 will tend to follow the surface 176. When the carriage 132 has moved downwardly a sufficient distance, the upper end portion 166 of catch spring 160 will again position itself within the upper recess of the cam 162. Accordingly, when the user releases the downwardly pressing force on the cover plate 145, the carriage 132 will again be secured in its closed position.

In further explanation, it should be emphasized that the end portion 166 of catch spring 160 comprises a relatively long elongated portion, with a short hooked portion at the distal end thereof as shown in FIGS. 1 and 2. The hooked portion maintains its curved configuration throughout operation of the power center 100. That is, when reference is made to the fact that end portion 166 "straightens," it is to the effect that the long elongated portion of end portion 166 becomes vertical and aligned with the lower portion 168 of catch spring 160. However, the hooked portion at the distal end of end portion 166 remains in a hook-like configuration. Accordingly, even with the long elongated portion of end portion 166 in a vertical or "straight" configuration, the hooked portion of end portion 166 will contact the lateral surface 176 of cam 162 as the cam 162 moves downward from above the catch spring 160.

As the carriage 132 is moved downwardly, the electrical device power cord 170 will tend to position itself through the brushes 146. The extrusion 112 receives the power cord 170 and prevents contact with external objects below the work surface 101. In accordance with the foregoing, the electrical device connected to the cord 170 is thus energized with the power source connections substantially hidden from view. In this manner, the power center 100 advantageously provides an aesthetically desirable power source outlet, with the further advantage that the power center 100 includes electrical receptacles 138 which can be extended upward from the work surface 101 so as to be made readily accessible to the user.

Figure 6:
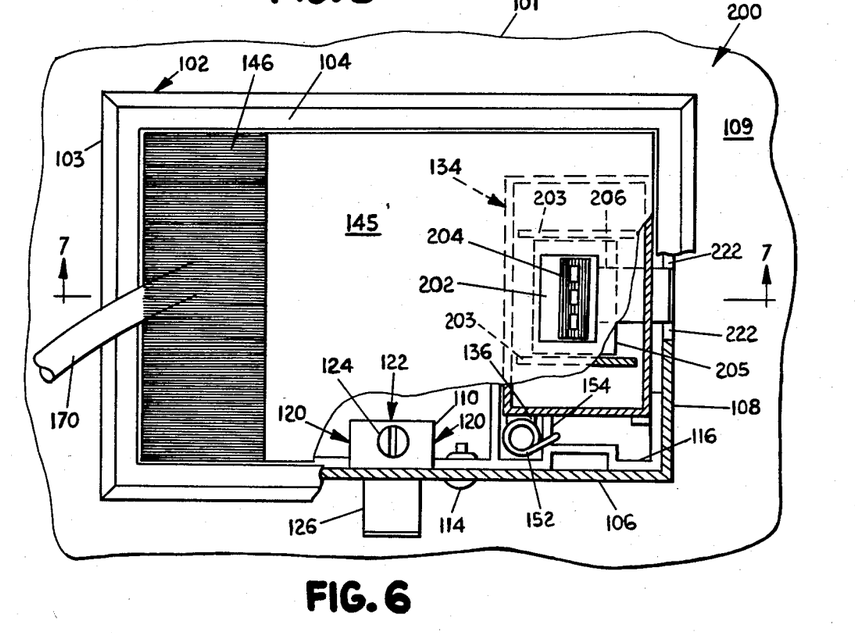
FIG. 6 is a plan view of an alternative embodiment of a power center in accordance with the invention, with the cover assembly partially broken away.
Figure 7:
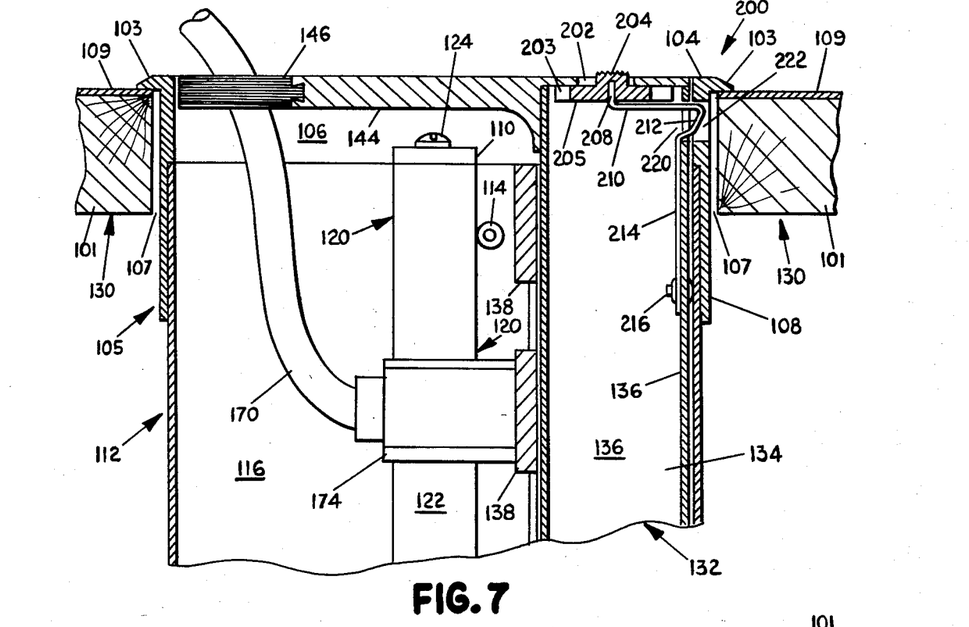
FIG. 7 is a sectional side view of the power center depicted in FIG. 6 taken along lines 7∫7 of FIG. 6.

A somewhat modified embodiment of a retractable power center in accordance with the invention is shown as power center 200 depicted in FIGS. 6 and 7. Elements of power center 200 comprising identical or substantially identical elements to those of power center 100 shown in FIGS. 1–5 and previously described herein are depicted in FIGS. 6 and 7 with like numerical references.

The power center 200 comprises a housing 102, extrusion 112 and carriage 132 substantially corresponding in structure and function to like numbered components of power center 100. In addition, power center 200 includes clamping assemblies and resilient activating means substantially identical to those of power center 100 and comprising screws 124, spring clips 126 and coil springs 152, all elements being relatively mounted and located in the manner previously described with respect to power center 100.

However, power center 200 differs from power center 100 with respect to the particular type of means employed for releasably securing the carriage 132 in the closed, retracted position. As depicted in FIGS. 6 and 7, power center 200 comprises a cover plate 145 having a slot 202 formed in a substantially centrally aligned location relative to receptacle box 134 located below plate 145. Extending vertically upward through slot 202 is a handle 204 having a lower handle base 205 secured thereto.

The handle base 205 is rectangular in shape, located immediately below plate 145 and has a planar cross-sectional area somewhat larger than the planar area of slot 202. The handle 204 and base 205 are supported in a manner subsequently described herein so as to be manually adjustable from right to left as viewed in FIG. 6. A pair of parallel tracking brackets 203 depend downwardly from plate 145 on opposing sides of the handle base 205 and prevent base 205 from moving laterally during use.

As depicted in FIG. 7, the means for releasably securing the carriage 132 in the retracted position also includes a flexible spring 206 having an upwardly extending portion 208 secured within the handle base 205. Portion 208 is perpendicularly connected to one end of a horizontal portion 210 which extends outwardly through a slot 220 in one of the side portions 136 of box 134. The horizontal portion is integral at its opposing end to a curved flange portion 212 which extends outwardly into a notch 222 (when the power center 200 is in the retracted position) cut into one side portion 108 of the sleeve 105 of housing 102. The flange portion 212 curves downwardly and is integral with a vertical portion 214 connected to an inner surface of one side portion 136 of box 134. The connection is made by rivet 216 or any suitable and conventional connecting means.

Turning to the operation of power center 200, the carriage 132 is releasably maintained in the retracted position by abutment of the flange portion 212 with the upper surface of notch 222. When the user desires to open the power center 200, the handle 204 is moved to the left as viewed in FIG. 6. The force exerted on the handle 204 causes the flange portion 212 of interconnected flexible spring 206 to be removed from slot 220 in the housing sleeve 105, thereby free to move vertically upward. Accordingly, the coil springs 152 are allowed to contract and correspondingly extend the carriage upwardly in the manner previously described with respect to the power center 100.

As the carriage 132 attains its fully extended and open position, further upward movement can be prevented by components such as the stop bracket 164 described with respect to power center 100, or by any other suitable stopping means. In addition, it is apparent that coil springs 152 can be adjusted in relation to carriage 132 so that the springs 152 attain their equilibrium position when the carriage 132 is in the fully open position above slot 107. Accordingly, unless it is desirable to prevent any further upward movement beyond the extended, open position, no stopping means would be required.

With the carriage 132 in the extended position, the user can then insert the electrical device cords 170 and interconnected plugs 174 into the receptacles 138. The user can then lower the carriage 132 by manually pressing downward on the cover plate 145. As the carriage 132 is initially lowered, the curved flange portion 212 of flexible spring 206 will extend outwardly from the slot 220 in side portion 136 of the receptacle box 134. As the carriage 132 continues its downward movement, the flange portion 212 is shaped so that it will be "squeezed" inwardly as it attains the horizontal plane of the housing collar 104. When the flange portion 212 attains the horizontal plane corresponding to the notch 222, the inward tension on the flexible spring 206 will be released and the flange portion 212 will move outwardly into the notch 222. This outward movement will be made visually apparent to the user by the corresponding movement of handle 204. When the flange portion 212 is received in the notch 222, the user can release the downward force on the cover plate 145 and the carriage 132 will be secured in the closed, retracted position.

An additional modified embodiment of a retractable power center in accordance with the invention is shown as the power center 300 depicted in FIGS. 8-11. Again, elements of power center 300 comprising identical or substantial identical elements to those of power centers 100 and 200 previously described are depicted in FIGS. 8-11 with like numerical references.

Figure 8:
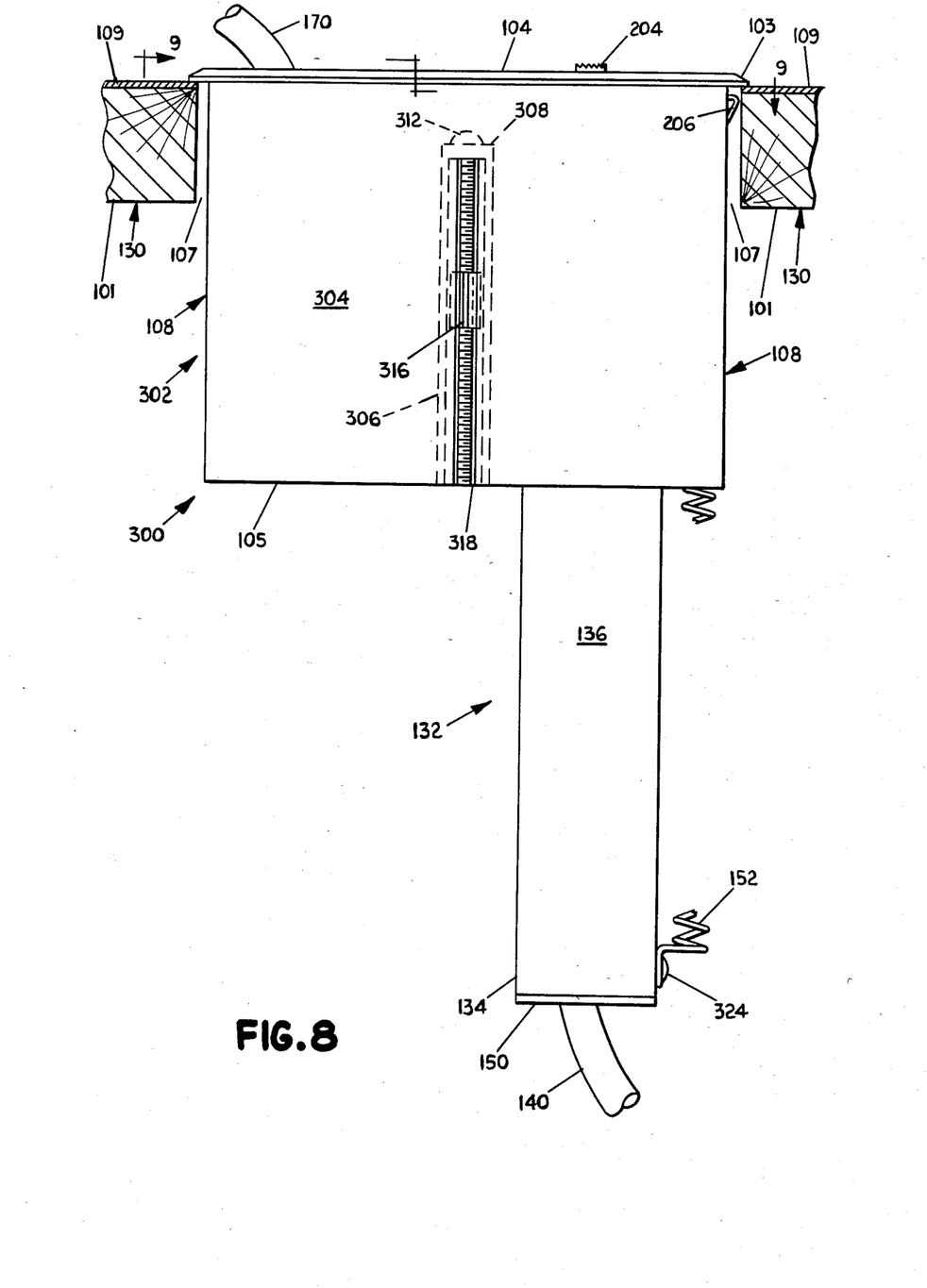
FIG. 8 is an elevational view of a further embodiment of a power center in accordance with the invention.
Figure 9:
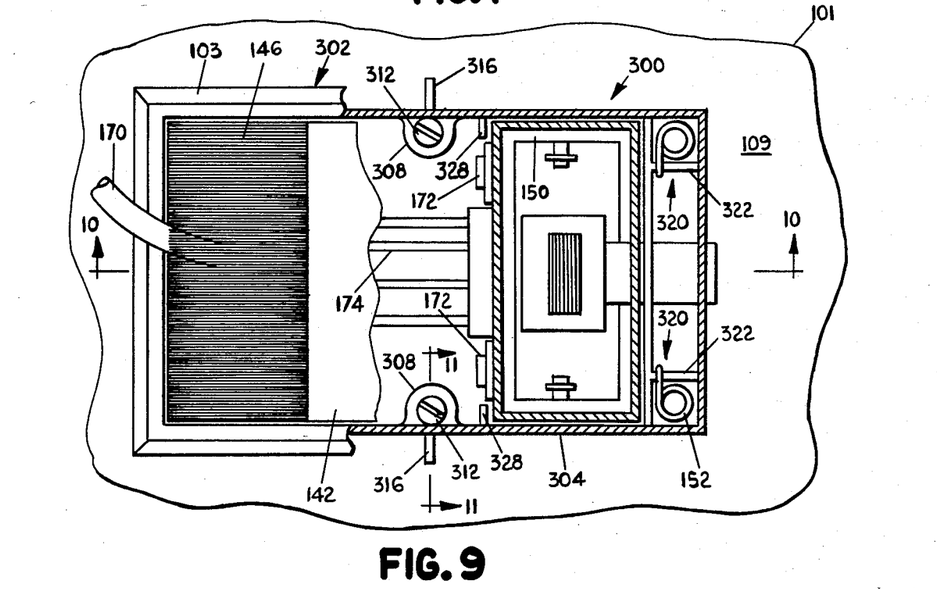
FIG. 9 is a sectional top view of the power center depicted in FIG. 8 taken along lines 9—9 of FIG. 8.
Figure 10:
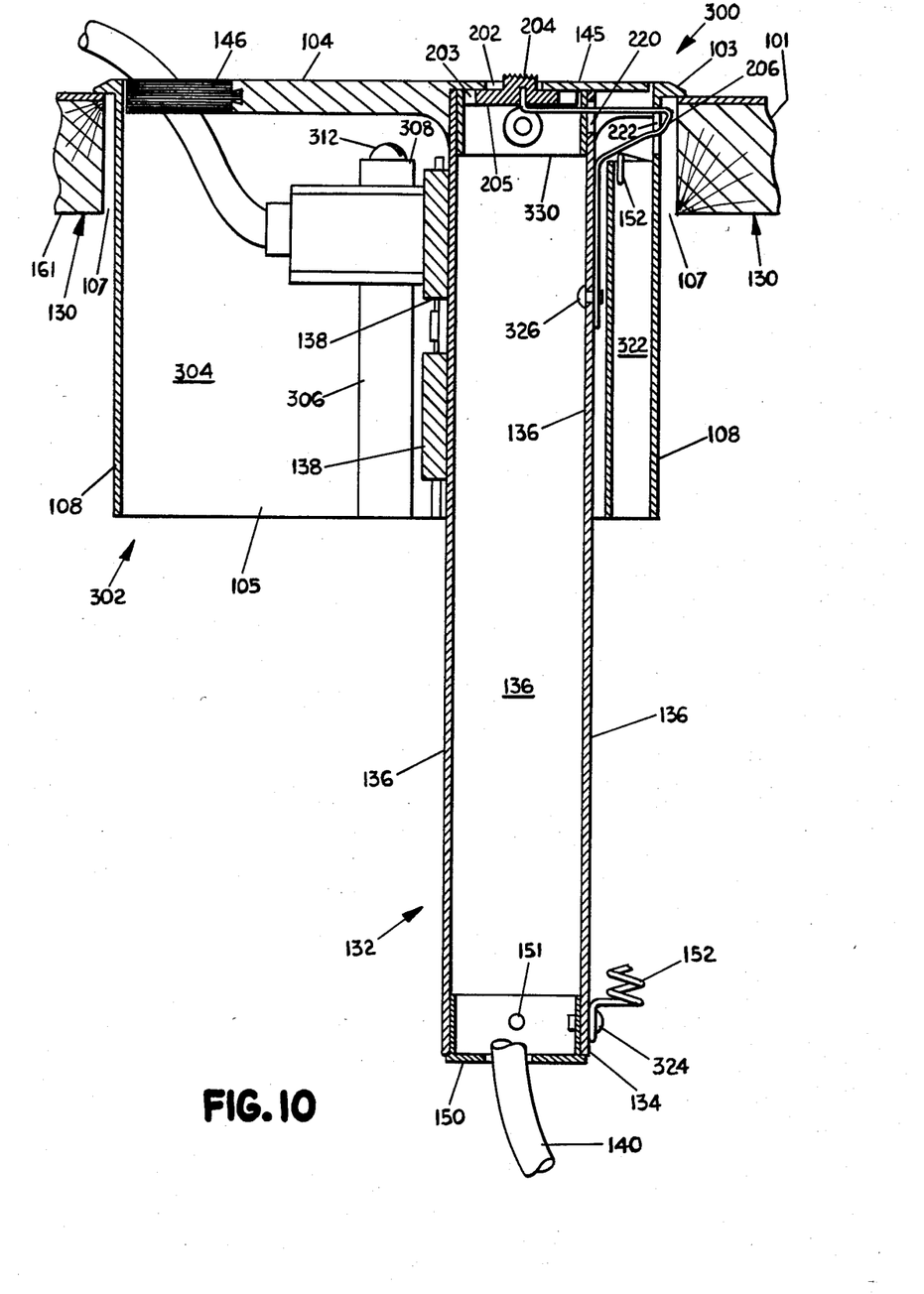
FIG. 10 is a sectional side view of the power center depicted in FIG. 8 taken along lines 10—10 of FIG. 9.

The power center 300 depicted in FIGS. 8-11 does not include an extrusion. Instead, as depicted in FIGS. 8 and 10, the receptacle box 134 of carriage 132 extends downwardly below a housing 302 and is open therebelow to the environment. In addition, the receptacle box 134 of power center 300 has a somewhat larger width relative to boxes 134 of power centers 100 and 200. Accordingly, the fuses or circuit breakers 172 can be located laterally with respect to receptacles 138 as depicted in FIG. 9.

Figure 11:
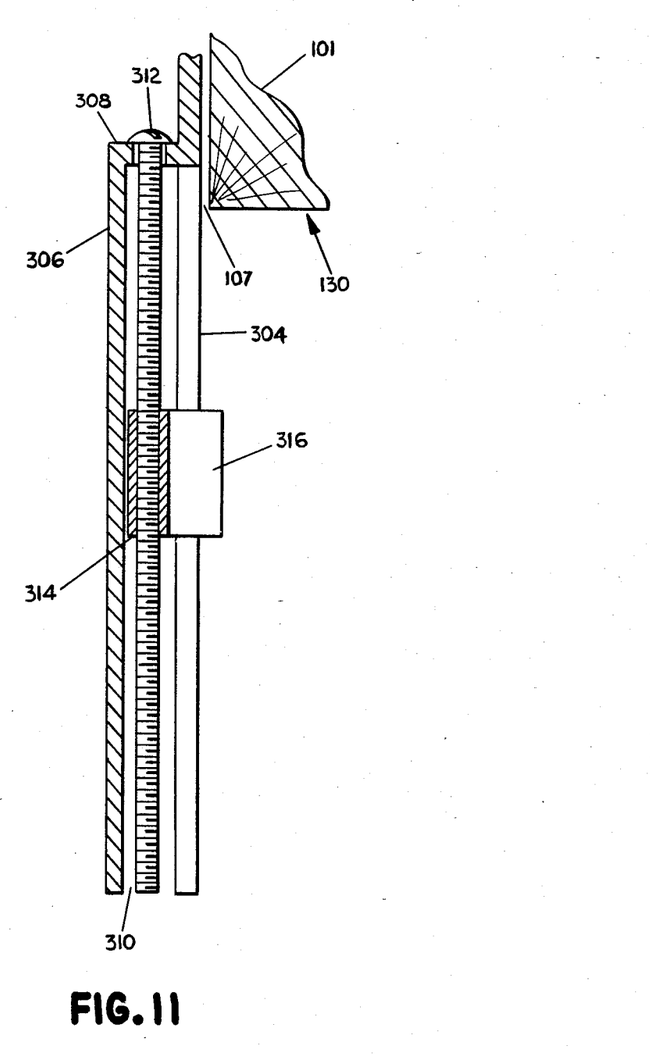
FIG. 11 is a fragmentary sectional view of one of the clamping assemblies of the power center depicted in FIG. 8 taken along lines 11—11 of FIG. 9.

The power center 300 includes a means for releasably maintaining the carriage 132 in a retracted position similar to that described with respect to power center 200. That is, the power center 300 employs a handle 204, base 205 and flexible spring 206. However, as depicted in FIG. 10, the flexible spring 206 is secured to an outer surface of one of the side portions 136 of receptacle box 104 by means of rivet 326 or other suitable connecting means. Referring to FIGS. 8-11 and the remaining distinctions between power center 300 and power center 200, the power center 300 includes a housing 302 substantially similar in structure to the housing 102 of power center 200, but slightly modified in cross-sectional configuration as depicted in FIG. 9. Specifically, the housing 302 includes a pair of opposing side portions 304 each having a curved portion 306 inwardly directed. Referring to FIG. 11, and one of the side portions 304, a ledge 308 extends inwardly from the portion 304 at the top of the curved portion 306. Accordingly, a curvilinear space 310 is formed between portion 304 and portion 306.

Each of the ledges 308 includes a vertically disclosed bore in which a threaded machine screw 312 or similar threaded means is received. When the machine screws 312 have been inserted into the bores of ledges 308, securing mechanisms 314 having threaded inner bores can be threadably received onto the machine screws 312 from the lower ends thereof. The securing mechanisms 314 each include a flexible flapper portion 316 which is initially coiled inwardly toward the main body of the cylindrical securing mechanism 314.

It should be emphasized that the flapper portions 316 will also be preengaged during assembly so as to extend outwardly through vertical, elongated slots 318 formed within the side portions 304.

The securing mechanisms 314 and flappers 316 have a cross-sectional area small enough to fit within the space 310 when threadably received onto the machine screws 312. As machine screws 312 are rotated, with the flappers 316 extending through the slots 318, the securing mechanisms 314 will thread further onto the screws 312 and move vertically upward so long as the associated flappers 316 are within the slots 318.

As the flappers 316 move upwardly, the securing mechanisms 314 will contact the lower surface 130 of the work surface 101. Further rotation of machine screws 312 will secure the housing 302 against the upper surface of work surface 101, thereby rigidly securing the power center 300 within the work surface slot 107.

The power center 300 also differs from power center 200 with respect to the location of the coil springs 152. As depicted in FIGS. 9 and 10, the housing 302 includes a pair of box shaped cells 320 integrally secured with the side portions 304 and 108 of the housing sleeve 105. Each of the coil springs 152 includes a lower end mounted to the lower portion of the receptacle box 134 in a vertically aligned manner with respect to the interior of a corresponding one of the box shaped cells 320. The coil springs 152 are thus extended upwardly and received within the cells 320 so that an upper end of each of the coil springs 152 is secured around and engages a wall 322 of each cell 320. The coil springs 152 are connected to the lower end of the receptacle box 134 by means of rivets 324 or similar and conventional connecting means.

The housing 302 also includes a pair of inwardly extending braces 328 as depicted in FIG. 9. The braces 328 provide a supporting means so as to prevent the receptacle box 134 from moving toward the left as viewed in FIG. 9. In addition, the receptacle box 134 is secured to the cover plate 145 by means of a rectangularly configured bracket 330. Although the structure of power center 300 is somewhat different than power center 200 with respect to the clamping assemblies, location of the coil spring activating means and configuration of the housing 302 and box 134, the general operations and functions of each power center are substantially equivalent.

Figure 12:
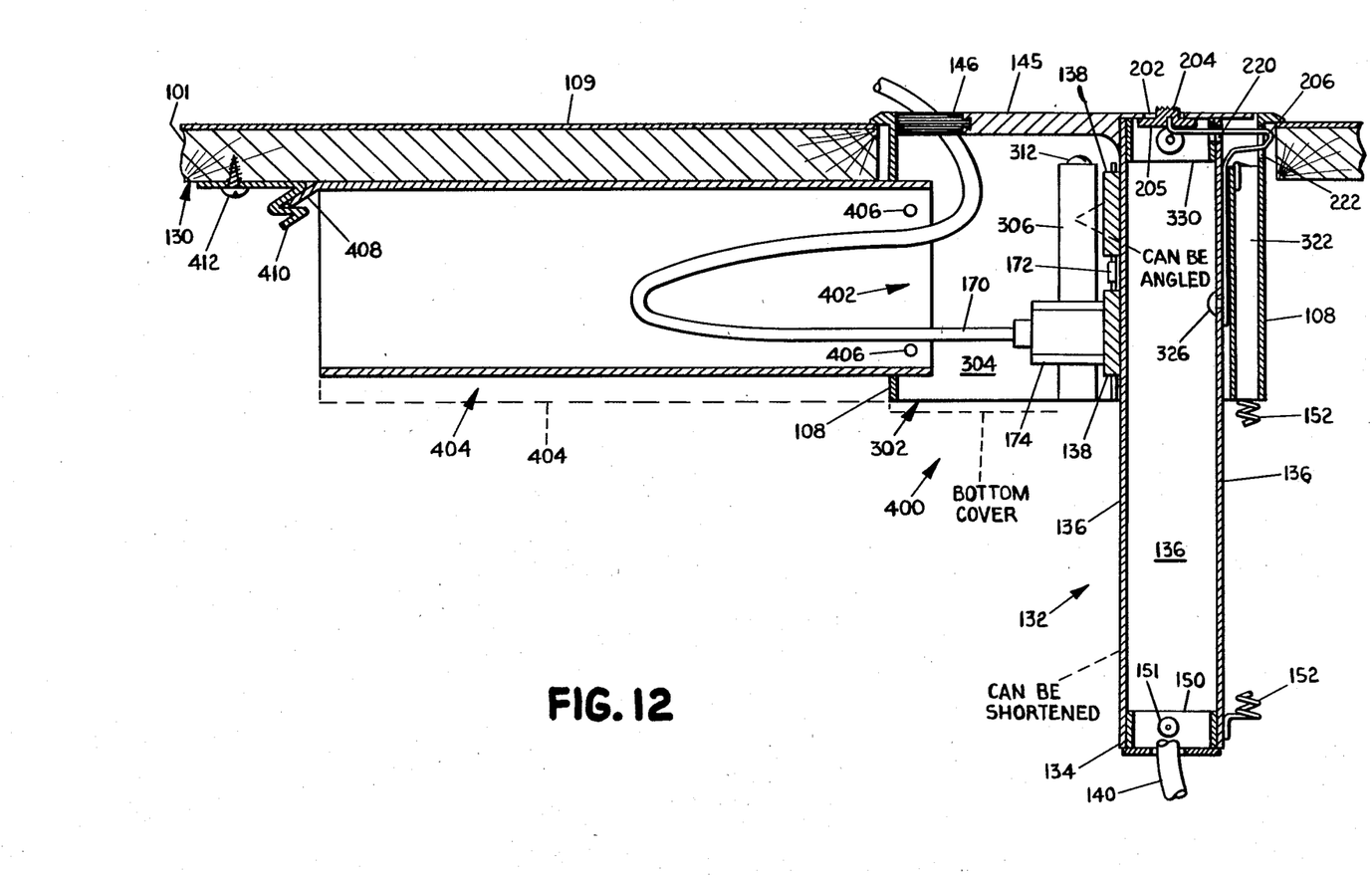
FIG. 12 is an elevational view of the power center depicted in FIG. 8 with a horizontally disposed extrusion for purposes of receiving electrical device cord, the section being taken through a vertical center plane of the power center similar to views depicted in FIGS. 4, 7 and 10.

A still further embodiment of a retractable power center in accordance with the invention is shown as power center 400 depicted in sectional view in FIG. 12. The power center 400 is substantially identical to the power center 300 previously described with respect to FIGS. 8–11, and the view of FIG. 11 is taken through a vertical plane in the central portion of the power center, similar to FIGS. 4, 7 and 10.

However, unlike the power center 300, the power center 400 includes one side portion 108 of the sleeve 105 of housing 302 includes a slot 402 in which a rectangularly shaped and elongated extrusion 404 is received. The extrusion 404 is mounted substantially horizontally and perpendicular to the receptacle box 134, unlike the vertically positioned extrusions 112 included in the previously described power centers 100 and 200. The extrusion 404 is connected at one end to the side portions 304 of housing 302 by means of rivets 406 or similar connecting means. The opposing end of extrusion 404 may be mounted to the lower surface of work surface 101 by any suitable securing means. For example, the extrusion 404 can include a downwardly angled flange 408 which is secured within a bracket 410 having a cross-sectional configuration as depicted in FIG. 12. The bracket 410 can be secured to the work surface 101 by means of a threaded wood screw 412 or a similar connecting means.

With the extrusion 404 incorporated within the power center 400, the power cords 170 of an electrical device energized by means of receptacles 138 can be received and coiled within the extrusion 404, thereby preventing slack in the cords 170 from inconveniently and sometimes dangerously being supported on the top of work surface 101 or hanging below the housing 302.

It should be emphasized that other alternative structural configurations could be employed with power center 400 and the other power centers described herein without departing from the novel concepts of the invention. For example, the extrusion 404 could be alternatively positioned as shown in dotted lines in FIG. 12 so as to be flush with the bottom of the sides 108 of housing 302. In addition, the housing 302 could be "closed off" by extending the lower portion of extrusion 404 (as viewed in FIG. 12) so as to form a bottom cover for housing 302, or providing a separate bottom cover.

Furthermore, instead of rigidly securing the cover plate 145 to box 134, the plate 145 can be hinged by any suitable hinge connection means. It would also be possible to shorten box 134 so that it would not extend below housing 302. In this manner, additional room below work surface 101 could be provided. Still further, the surfaces on which the receptacles 138 are positioned could be angled so as to provide relative ease of plug installation. In addition, it would also be possible to secure the extrusion 404 in a manner so that it could selectively be located in a vertical position as in power center 100, or, alternatively rotated to a horizontal position as in power center 400. As apparent from the foregoing, numerous alternative structural configurations could be employed in power centers constructed in accordance with the invention.

Figure 13:
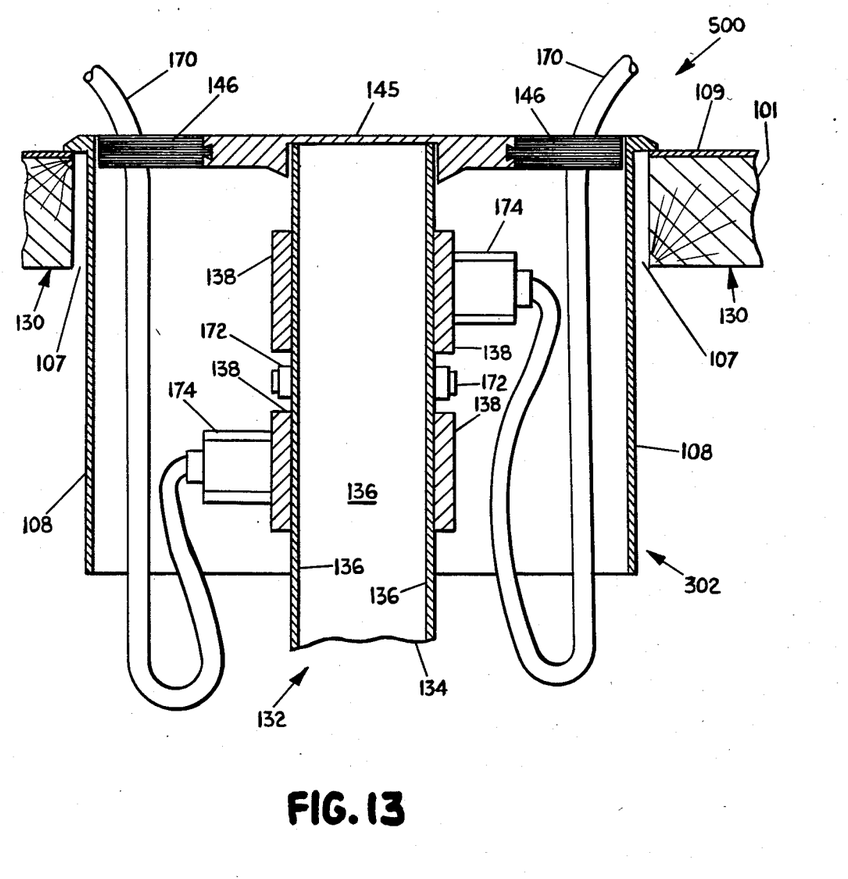
FIG. 13 depicts a further embodiment of a power center in accordance with the invention, with the power center having dual receptacles mounted on opposing sides of the receptacle box.

Finally, an additional embodiment of a power center in accordance with the invention is depicted as power center 500 in FIG. 13. The sectional view of FIG. 13 is taken through a vertical center plane similar to the views of FIGS. 4, 7, 10 and 11. Power center 500 includes a receptacle box 134 having dual sets of electrical receptacles 138 mounted on opposing side portions 136 of the box 134. In addition, so as to allow the cords 170 of the electrical devices to be energized to extend upwardly from either side of the receptacle box 134, the cover plate 145 includes a pair of brush sets 146 extending outwardly from opposing sides of the cover plate 145. For purposes of brevity, the means for releasably maintaining the box 134 of carriage 132 in the retracted position, and the means for rigidly securing the housing 102 within the work surface slot 107 and extending the carriage 132 upwardly to the fully open position are not depicted in FIG. 13. However, the activating means corresponding to the coil springs 152 of the previously described embodiments of power centers in accordance with the invention can clearly be employed. In addition, the flexible springs 206 of power centers 200 and 300, and the catch spring 160 of power center 100 can be implemented to provide a means for releasably securing the carriage 132 of power center 500 in the retracted position.

It will be apparent to those skilled in the pertinent arts that other embodiments of power centers in accordance with the invention can be designed. That is, the principles of a retractable power center are not limited to the specific embodiments described herein. For example, the coil springs 152 or other activating means can clearly be located in various positions relative to the carriage 132. In addition, the receptacles 138 mounted to the receptacle box 134 in the various embodiments can clearly be located as desired. As another example, the extrusion 112 can be removed from the power center (FIGS. 8–11), vertically positioned (FIGS. 1–7) or horizontally located (FIG. 12). Accordingly, it will be apparent to those skilled in the art that modifications and other variations of the above-described illustrative embodiments of the invention may be effected without departing from the spirit and scope of the novel concepts of the invention.

The embodiments of the invention in which an exclusive property or privilege is claimed are defined as follows:

1. In a power center mounted in a desk or work surface at a selectible working height, and comprising receptacle means supplying electrical power from an interconnected common power source to selectively interconnected electrical devices, the improvement which comprises:

a stationary housing means mounted within a slot formed in the desk or work surface;

carriage means coupled to the housing means and mounting the receptacle means so as to be movable with respect to the housing means;

spring activating means coupling the housing means and the carriage means and imparting forces to the carriage means so as to move the carriage means and receptacle means between a retracted, closed position and an extended, open position, wherein the receptacle means is substantially hidden from view when the carriage means is in the retracted position, and the receptacle means is accessible to a user to receive power cords and plugs of the electrical devices when the carriage means is in the extended position;

securing means releasably maintaining the carriage means in the retracted position and responsive to manually exerted forces to automatically release the carriage means and allow the activating means to impart the forces to the carriage means;

the receptacle means are mounted to the carriage means so that the electrical devices can remain energized from the power source when the carriage means is in the retracted, closed position; and the carriage means comprises means allowing the power cords of the electrical devices to extend below the surface and remain connected to the receptacle means when the carriage means is in the retracted, closed position and substantially hidden from view.

2. A power center in accordance with claim 1 and further comprising stop means prohibiting further extending movement of the carriage means when the carriage means attains the extended position.

3. A power center in accordance with claim 1 and further comprising clamping means coupled to the housing means and rigidly securing the housing means to the desk or work surface.

4. A power center in accordance with claim 3 wherein the clamping means comprises:
threaded means rotatably mounted to the housing means and providing manual adjustment of the mounting of the housing means within the slot; and
clip means threadably coupled to the threaded means and having flexible flange portions contacting a lower surface of the desk or work surface so as to rigidly secure the housing means to the desk or work surface.

5. A power center in accordance with claim 1 wherein the carriage means further comprises:
cover means positioned substantially flush with an outer surface of the desk or work surface and substantially hiding from view the receptacle means below the surface when the carriage means is in the retracted position.

6. A power center in accordance with claim 1 wherein the carriage means comprises:
an elongated receptacle box positioned at least partially within the housing means and below an outer surface of the desk or work surface when the carriage means is in the retracted position, and at least partially extending above the outer surface when the carriage means is in the open position, wherein the receptacle means is mounted on an outer surface of at least one side of the receptacle box; and
the spring activating means is secured to the lower end of the receptacle box.

7. A power center in accordance with claim 6 wherein the carriage means further comprises:
cover means connected to the upper end of the receptacle box for at least partially enclosing the slot when the carriage means is in the retracted position; and
at least one set of flexible brushes extending outwardly from the cover means and remaining within the housing means for allowing the power cords of the electrical devices to extend into the slot when the carriage means is in the retracted position.

8. A power center in accordance with claim 1 wherein the activating means comprises means resiliently connected between the carriage means and the housing means.

9. A power center in accordance with claim 1 wherein the activating means comprises coiled spring means having a lower end rigidly connected to a lower portion of the carriage means, and an upper end coupled to the housing means.

10. A power center in accordance with claim 9 wherein
the coiled spring means are maintained in an extended, loaded tension configuration when the carriage means is in the retracted position; and
the coiled spring means is responsive to the securing means releasing the carriage means to move the carriage means to the extended position, whereby movement of the carriage means is caused by contraction of the coiled spring means.

11. A power center in accordance with claim 10 wherein the carriage means comprises an elongated receptacle box and the coiled spring means comprises a pair of coiled springs extending parallel and adjacent to the box, wherein each of said coiled springs includes one end rigidly secured to a lower end of the box.

12. A power center in accordance with claim 1 wherein the securing means releasably maintaining the carriage means in the retracted position comprises:
spring means mounted to the housing means and imparting a force to the carriage means opposing extending movement of the carriage means toward the extended position; and
catch means mounted to the carriage means and releasably securing the spring means so as to maintain the carriage means in the retracted position.

13. A power center in accordance with claim 12 wherein:
the carriage means comprises an elongated receptacle box having the receptacle means mounted thereon;
the spring means comprises a catch spring mounted to the housing means; and
the catch means comprises a cam mounted to the receptacle box and having a cam-shaped lateral surface with a recess at an upper portion thereof, wherein one end of the catch spring is engaged in the recess when the carriage means is in the retracted position, and
wherein manually activated movement of the carriage means from the retracted position releases the catch spring from the recess of the cam.

14. A power center in accordance with claim 13 wherein the power center further comprises:
a stop bracket mounted to one side of the receptacle box and contacting an opposing end of the catch spring when the carriage means attains the open position, thereby prohibiting further extending movement of the receptacle box.

15. A power center in accordance with claim 1 wherein the means releasably maintaining the carriage means in the retracted position comprises:
resilient clip means coupled to a manually adjustable handle and connected to the carriage means, wherein the resilient clip means is partially received within a notch formed in the housing means when the carriage means is in the retracted position so as to maintain the carriage means in said retracted position; and manual movement of the adjustable handle causes the clip means to be released from the notch, thereby allowing extending movement of the carriage means toward the extending position relative to the housing means.

16. A power center in accordance with claim 1 wherein the power center further comprises:
stop means mounted to the carriage means and prohibiting further extending movement of the carriage means when the carriage means attains the extended position; and
clamping means connected to the housing means and rigidly securing the housing means to the desk or work surface within the slot.

17. A power center in accordance with claim 16 wherein:
the housing means comprises an upper collar positioned substantially flush with an upper portion of the planar surface, and a sleeve connected to and extending below the collar and received within the slot;
the carriage means comprises an elongated receptacle partially received within and extending below the sleeve, and a cover plate secured to the upper end of the receptacle box and positioned substantially flush with the upper collar when the carriage means is in the retracted position;
the receptacle means comprises at least one electrical receptacle conductively connected to the common power source and mounted to an outer lateral surface of the receptacle box; and
the activating means comprises a pair of coiled springs maintained in an extended, tension configuration when the carriage means is in the retracted position, wherein each of said coiled springs includes a lower end secured to the receptacle box and an upper end engaged with the housing means.

18. A power center in accordance with claim 1 wherein the housing means comprises:
a stationary housing chamber having an upper collar positioned substantially flush with an upper portion of the planar surface and overhanging the perimeter of the slot;
a rectangular sleeve connected to and extending below the upper collar and received within the slot;
an elongated extrusion received within and extending below the sleeve; and
the carriage means comprises an elongated receptacle box received within the extrusion, wherein power cords connected to the electrical devices are located within the extrusion when the electrical devices are energized from the receptacle means and the carriage means is in the retracted position.

19. A power center in accordance with claim 17 wherein:
the housing means further comprises an elongated extrusion received within and connected to the sleeve so as to extend therebelow;
the securing means releasably maintaining the carriage means in the closed position comprises spring means mounted to the extrusion and imparting a force to the receptacle box opposing extending movement of the carriage means from the retracted position, and catch means mounted to the receptacle box and releasably securing the spring means so as to maintain the receptacle box in the retracted position;
the spring means comprises a catch spring mounted to the extrusion and the catch means comprises a cam mounted to the receptacle box, and having a cam-shaped lateral surface with a recess at an upper portion thereof, wherein one end of the catch spring is engaged in the recess when the carriage means is in the retracted position;
the stop means comprises a bracket mounted to an external surface of the receptacle box, wherein the bracket contacts another end of the catch spring when the carriage means attains the extended position, thereby prohibiting further extending movement of the carriage means; and
the clamping means comprises a pair of threaded screws rotatably mounted to opposing sides of the sleeve, and a pair of spring clips each threadably received on one of the threaded screws and including an angled flange portion extending upwardly and contacting a lower portion of the desk or work surface so as to rigidly secure the housing means within the slot.

20. A power center in accordance with claim 1 and further comprising circuit breakers conductively interconnected between the receptacle means and the common power source and protecting the interconnected electrical devices in the event of circuit overload or electrical malfunction.

* * * * *